United States Patent
Horesh et al.

(10) Patent No.: US 11,080,363 B2
(45) Date of Patent: Aug. 3, 2021

(54) FREE-FORM DISCOVERY OF DIFFERENTIAL EQUATIONS

(71) Applicant: International Business Machines Corporation, Armonk, NY (US)

(72) Inventors: Lior Horesh, North Salem, NY (US); Giacomo Nannicini, New York, NY (US); Raya Horesh, North Salem, NY (US); Wang Zhou, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 15/843,234

(22) Filed: Dec. 15, 2017

(65) Prior Publication Data
US 2019/0188236 A1    Jun. 20, 2019

(51) Int. Cl.
*G06F 30/20*    (2020.01)
*G06F 17/13*    (2006.01)
(Continued)

(52) U.S. Cl.
CPC .............. *G06F 17/13* (2013.01); *G06F 30/20* (2020.01); *G06N 20/00* (2019.01); *G06F 2111/10* (2020.01)

(58) Field of Classification Search
CPC .... G05B 23/0281; G05B 17/02; G06N 7/005; G06N 20/00; G06N 5/006; G06F 17/13;
(Continued)

(56) References Cited

U.S. PATENT DOCUMENTS

| 5,408,638 A | 4/1995 | Sagawa et al. |
| 8,332,188 B2 | 12/2012 | McConaghy |

(Continued)

OTHER PUBLICATIONS

Bongard et al., "Automated reverse engineering of nonlinear dynamical systems", PNAS, Jun. 12, 2007, vol. 104, No. 24, pp. 9943-9948, www.pnas.org/cgi/doi/10.1073/pnas.0609476104.
(Continued)

*Primary Examiner* — Kandasamy Thangavelu
(74) *Attorney, Agent, or Firm* — Scully, Scott, Murphy & Presser, P.C.; Anthony Curro

(57) ABSTRACT

Free-form discovery of differential equations for modeling a physical system or process under investigation that includes defining a formal language sentence grammar that describes admissible relationships between quantities, and incorporating the use of such grammar for free-(functional) form, automatic discovery of differential equations. The method requires minimum knowledge of the desired differential equation and is universally applicable to ordinary and partial differential equations. From received training set data representing inputs to the physical system and measured outputs, a numerical error bound data, primitive operators, differential equation operators, variables, coefficients and grammatical rules that define the syntax of valid expressions, the system finds a model characterized by sources of error to find a simplest (minimum complexity) mathematical expression comprising differential operators such that a discrepancy between the observed data and the value of the mathematical expression is bounded, and the mathematical expression is consistent with valid syntax constraints.

14 Claims, 6 Drawing Sheets

(51) Int. Cl.
*G06N 20/00* (2019.01)
*G06F 111/10* (2020.01)

(58) Field of Classification Search
CPC ........ G06F 30/20; G06F 8/10; G06F 2111/10; G01V 99/00
See application file for complete search history.

(56) References Cited

U.S. PATENT DOCUMENTS

| | | | |
|---|---|---|---|
| 9,223,755 B2* | 12/2015 | Gilg | G06F 17/13 |
| 2011/0307438 A1* | 12/2011 | Fernández Martínez | G06N 7/005 706/52 |
| 2013/0116988 A1* | 5/2013 | Zhang | G06F 8/10 703/2 |
| 2013/0197877 A1* | 8/2013 | Lu | G01V 99/00 703/2 |
| 2015/0006129 A1 | 1/2015 | An et al. | |
| 2015/0193565 A1 | 7/2015 | Kim et al. | |
| 2016/0306908 A1* | 10/2016 | Fontes | G06F 30/20 |
| 2017/0004231 A1 | 1/2017 | Avron et al. | |
| 2017/0329289 A1* | 11/2017 | Kohn | G05B 17/02 |
| 2019/0102657 A1* | 4/2019 | SayyarRodsari | G05B 23/0281 |

OTHER PUBLICATIONS

Horesh et al., "Globally Optimal MINLP Formulation for Symbolic Regression", IBM Research Report, Aug. 9, 2016.
Schmidt et al., "Distilling Free-Form Natural Laws from Experimental Data", SCIENCE, vol. 324, Apr. 3, 2009, pp. 81-85.

* cited by examiner

FREE-FORM DISCOVERY OF DIFFERENTIAL EQUATIONS

BACKGROUND

The present invention generally relates to automatic model discovery and more particularly, to systems and methods for discovering differential equations governing a broad range of systems or phenomena under investigation.

Differential equations are prevalent in describing a broad range of systems and phenomena.

Discovery of differential equations introduces a unique challenge, as the expression is not only implicit, but also refers to a system's local behavior (e.g. temporally or spatially).

Empirical approaches which discovers models on a trial-and-error basis to fit the observed data to a pre-selected structures of model equations does not necessarily reveal the model that governs the behavior of the observed system, and is limited by the selected pool of model structures.

BRIEF SUMMARY

The present invention describes a system, method and computer program product for modeling a dynamic physical system or a process under investigation and discovery of differential equations. For model discovery there is a defined grammar that describes admissible relationships between quantities and that is incorporated for automatic discovery of differential equations. In one aspect, the method requires minimum knowledge of the desired differential equation; and the method is universally applicable to ordinary and partial differential equations.

In one aspect, the method comprises receiving at a hardware processor, a training data set providing data representing a process, a phenomenon or a physical system to be modeled, the training data including input data to the physical system or phenomenon and data relating to measurement outputs observed at the physical system or phenomenon; accessing, using the hardware processor, a plurality of formal language sentences representing differential equation expressions that map to data points in a defined model space, each sentence corresponding to a respective valid differential equation in a respective defined model space; iteratively processing, at the hardware processor, one or more sentences of the plurality to identify a differential equation expression corresponding to an equation that relates the training input data and observed outputs such that a numerical discrepancy between an evaluation of the differential equation for the training input data and the observed output is bounded within a numerical error bound tolerance; and outputting a simplest differential equation expression satisfying the input training set data within the numerical error bound tolerance.

Other embodiments include a computer program product and a system.

BRIEF DESCRIPTION OF THE SEVERAL VIEWS OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
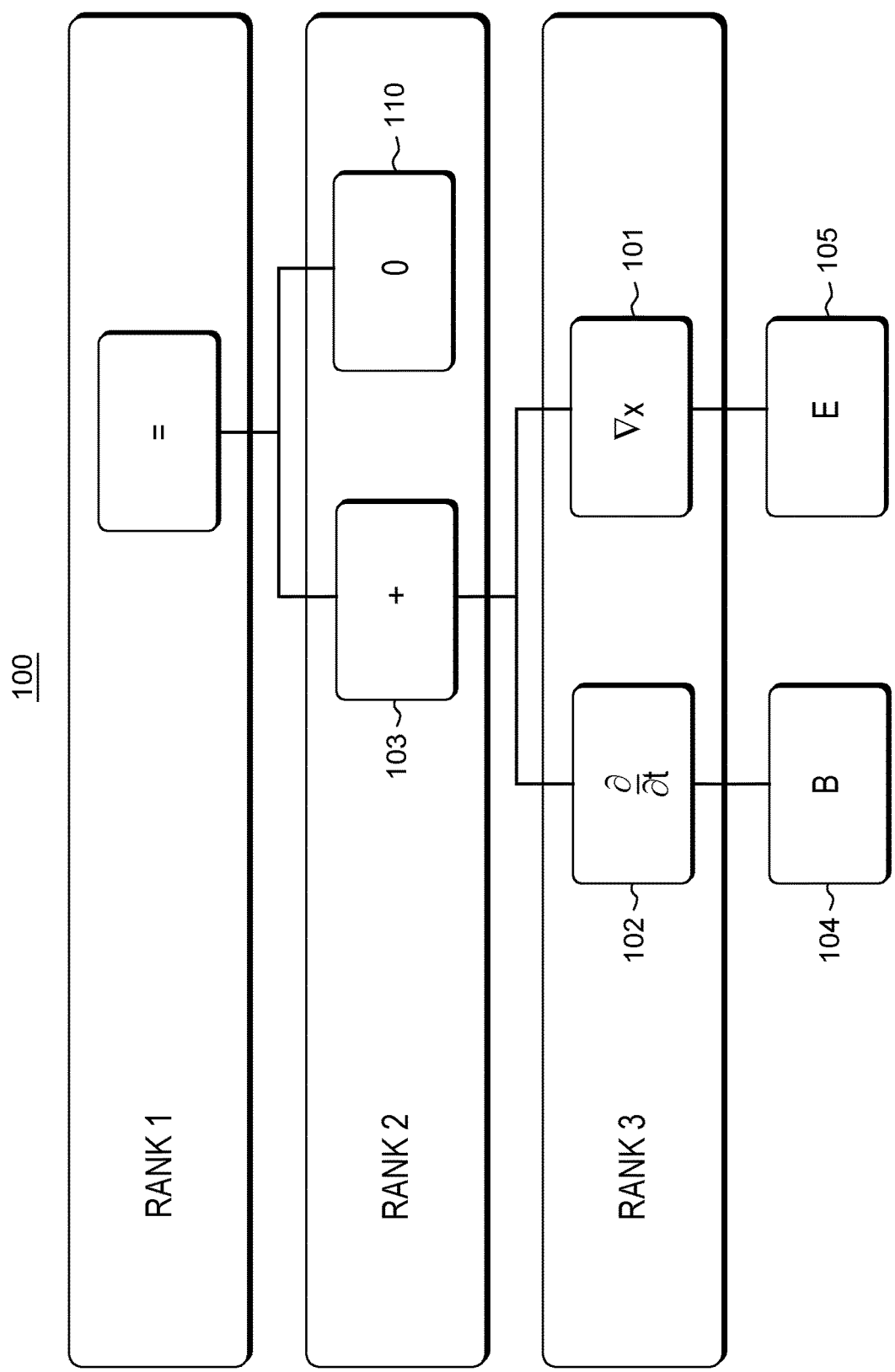
FIG. 1 shows an example expression tree which is a combinatorial construct including linked nodes, where the nodes are organized by rank.

In one embodiment, there is provided a globally optimal, free-form methodology for the discovery of mathematical models involving differential equations. The discovery of such models to describe a system of unknown form is based on experimental data (observations).

In embodiments described herein, an equation is represented as a sentence in a formal language (the language of mathematical expressions). The language describes the admissible relations between the primitives of the equation (namely operators, differential operators, variables and coefficients).

In one aspect, the systems and methods herein define grammars for use in the automatic discovery of differential equations. A "grammar" is a sentence that describes admissible relationships between entities. A grammar defines relationships among entities, e.g., a set of entities, with rules that govern use and combinations of entities, e.g., operators (e.g., +, −, ×, /, as well as some that may not be used (but are not known a-priori to be useless in the context of the discovery of such an equation), such as 'sqrt', '^', 'log' . . . ), differential operators (e.g., divergence, gradient, rotor, adjoint of the curl, first-order and second-order time derivatives, partial derivatives of any order (e.g., first order), curls, integral, Laplacian) and sets of variables and constants. In one embodiment, a grammar is encoded as a set of rules defining how these set of quantities, e.g., represented as mathematical symbols of a mathematical language, are put together. A combination of the symbols represents a meaningful differential equation.

In one aspect, there is no specific functional form because differential operators become an extension of a formal language. In embodiments, there are no limits on the functional form of the differential equation other than mathematical correctness, and no prior knowledge of the functional form of the differential equation is required in the process of discovering a mathematical model describing a phenomenon under investigation.

The grammar defines admissible relationships that the entities such as the operators, differential operators, variables and constants can hold. The method requires minimum knowledge of the desired differential equation. The computer system runs methods employing grammars that are universally applicable to ordinary and partial differential equations.

The grammar may further define mathematical constraints where symbols of the mathematical language are mapped to points in a mathematical space e.g., a 3-dimensional (3-D) Euclidean space. Grammar rules or constraints define the conditions that the points should satisfy to represent a sentence (of the mathematical language). Thus the system employs methods to identify which points in the space correspond to well-formed mathematical expressions. In one embodiment, this space can be searched to find exact expressions that explain, with certainty, the data received from experimental results or observations involving a dynamic physical system or natural phenomena under investigation. Thus, based on the data, a correct form of the mathematical expression, i.e., differential equation, that governs the phenomena, can be found.

In one aspect, differential equations can be represented by means of an expression tree which is a way of representing a mathematical expression, ensuring that the expression follows a correct syntax.

FIG. 1 shows an example expression tree 100 which is a combinatorial construct including linked nodes, e.g., nodes 101, 102, 103. In one aspect, the nodes are organized by rank, where the root node has rank zero and any subnode of a parent node has a rank one greater than the parent node's rank. In this way, the definition of rank is inductively extended over the entire tree. Since rank encodes a parent-child relationship between nodes, a tree cannot have any cycles. The example expression tree 100 shown in FIG. 1 is a grammar syntax encoding a point form of a Maxwell's Equation relating electrical and magnetic fields:

$$\nabla \times E = -\frac{\partial B}{\partial t}.$$

In this example, by parsing such expression tree 100, the resulting grammar is encoded as mathematical constraints that define relationships among entities including: differential operations represented in nodes 101, 102, primitive operators represented in node 103, continuous variables 104, 105 and constants 110. In one aspect, a set of symbols represent the differential operators, primitive operators, variables, coefficients, along with grammatical rules that define the syntax of valid expressions. In accordance with the system and methods herein, data results of experiments/observations relating, for example, to a natural phenomenon under investigation, describe a set of points that can be mapped to a well formed expression represented in a mathematical search space.

Figure 2:
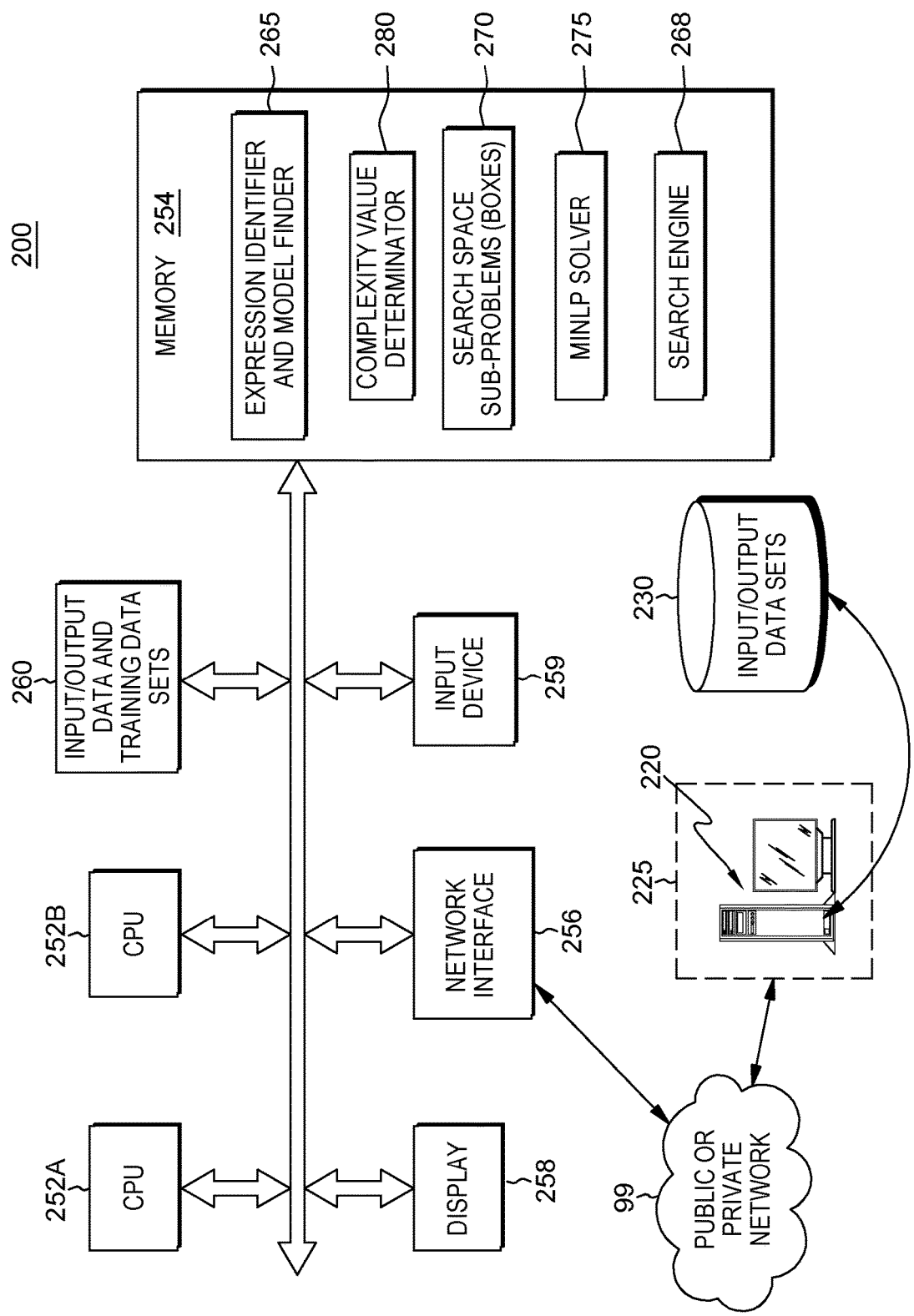
FIG. 2 depicts one embodiment of a computer system configured to automatically discover differential equations that define observations and measurements associated with natural physical phenomena under investigation.

Referring now to the system 200 of FIG. 2, there is depicted a computer system 200 providing the ability for automated discovery of differential equations to define observations and measurements associated with natural physical phenomena. In some aspects, system 200 may include a computing device, a mobile device, or a server. In some aspects, computing device 200 may include, for example, personal computers, laptops, tablets, smart devices, smart phones, or any other similar computing device.

Computing system 200 includes one or more processors 252A, 252B, a memory 254, e.g., for storing an operating system and program instructions, a network interface 256, a display device 258, an input device 259, and any other features common to a computing device. In some aspects, computing system 200 may, for example, be any computing device that is configured to communicate with a web-site 225 or web- or cloud-based server 220 over a public or private communications network 99. Further, as shown as part of system 200, training data sets including experimentally obtained/measured data of a phenomenon under investigation may stored locally in an attached memory storage device 260, or stored in a remote memory storage device 230, e.g., a database, and accessed via a remote network connection for input to the system 200.

In the embodiment depicted in FIG. 2, processor 252A, 252B may include, for example, a microcontroller, Field Programmable Gate Array (FPGA), or any other processor that is configured to perform various operations. Processor 252 may be configured to execute instructions as described below. These instructions may be stored, for example, as programmed modules in memory storage device 254.

Memory 254 may include, for example, non-transitory computer readable media in the form of volatile memory, such as random access memory (RAM) and/or cache memory or others. Memory 254 may include, for example, other removable/non-removable, volatile/non-volatile storage media. By way of non-limiting examples only, memory 254 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 256 is configured to transmit and receive data or information to and from a web-site server 220, e.g., via wired or wireless connections. For example, network interface 256 may utilize wireless technologies and communication protocols such as Bluetooth®, WWI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 200 to transmit information to or receive information from the server 220.

Display 258 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 258 may include a liquid crystal display (LCD), an e-paper/e-ink display, an organic LED (OLED) display, or other similar display technologies. In some aspects, display 258 may be touch-sensitive and may also function as an input device.

Input device 259 may include, for example, a keyboard, a mouse, a touch-sensitive display, a keypad, a microphone, or other similar input devices or any other input devices that may be used alone or together to provide a user with the capability to interact with the computing device 200.

With respect to the ability of computer system 200 for discovering differential equations governing observed physical phenomena, the system 200 further includes: a database 260 configured for storing training data sets and other input output data sets that are used to generate mathematical program (e.g., grammars) having differential operators. In one embodiment, this database 260 may be local to the computer or mobile device system 200, or otherwise, such database 260 may be associated with the remote server 220, over a network, e.g., a cloud.

The system 200 implements processing methods that process data representing input conditions governing a phenomenon under investigation, and observations and corresponding results output data (e.g., data obtained from one or more sensor devices configured to monitor the phenomena under investigation) of the phenomenon under investigation. The methods are employed to map that input data to a grammar defining relationships among entities, e.g., variables, constants, operations and differential operators. A grammar is defined that represents a differential equation expression that can then be used to explain the particular phenomenon under investigation. In one embodiment, the grammars include an encoding of the grammatical rules that define the syntax of valid expressions of differential equations and syntax constraints that the received data is evaluated against.

In one embodiment, programmed processing modules stored in a device memory 254 provide the system with abilities for differential equation discovery based on received sets of input condition data and observed/measured output data of a physical phenomenon or process under investigation.

In an illustrative, non-limiting example, it is desired to discover Maxwell equations in the quasi-static domain, e.g., the discovery of the Maxwell's equation described in connection with the expression tree 100 of FIG. 1. In such an example, training data may include, but are not limited to: measurements of an electromagnetic (electric and magnetic) fields E, B, dielectric properties of the domain (in the form of conductivity and magnetic permittivity), and source terms (current and charge densities). Several datasets involving these parameters are required to ensure that the interdependencies between the various parameters can be established. In applications, the input training data may include output results of a sensor device(s), e.g., data pertaining to a physical measurement associated with phenomena under investigation.

Further input to the system may be any syntax constraints that may be used. For example, if it was desired to impose conservation (as in the continuity equation), which is Gauss law expressed as:

$$\nabla \times E - \frac{\rho}{\varepsilon_0} = 0$$

Then it is meant that the expression for the equation would sum-up to zero.

In one embodiment, a valid set of input training instances may include: multiple instances of model parameters, source terms, geometrical representation (if relevant); a valid set of output training instances may include: measurements (or simulation output) of the state parameters for each instance.

In consideration of a further example, provided is a basic diffusion advection equation of the form:

$$\frac{\partial u}{\partial t} - \nabla \cdot \kappa \nabla u = s$$

where a discrete representation of the variables and differential operators is represented by:

$u_h, s_h \in \mathbb{R}^{n_1 \times n_2}$ $K_h \in \mathbb{R} \, \mathbb{R}^{n_1 \times n_2}$ $\nabla_h: \mathbb{R}^{n_1 \times n_2} \to \mathbb{R}^{n_1 \times n_2 \times 2}$ $\nabla_h: \mathbb{R}^{n_1 \times n_2 \times 2} \to \mathbb{R}^{n_1 \times n_2}$ In this example scenario, the user may provide several instances of the material properties K, the source term s and measure respectively the corresponding scalar field u.

Figure 5B:
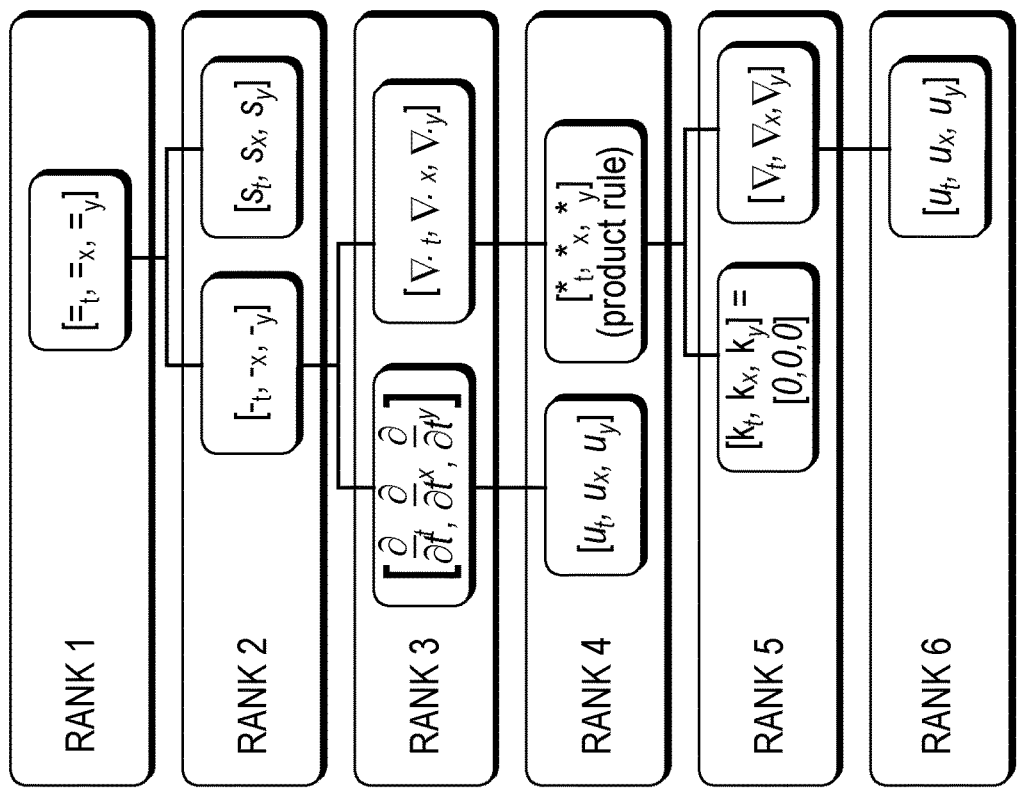
FIGS. 5A and 5B depicts further example expression trees to represent the differential equation symbolically in an example.
Figure 5A:
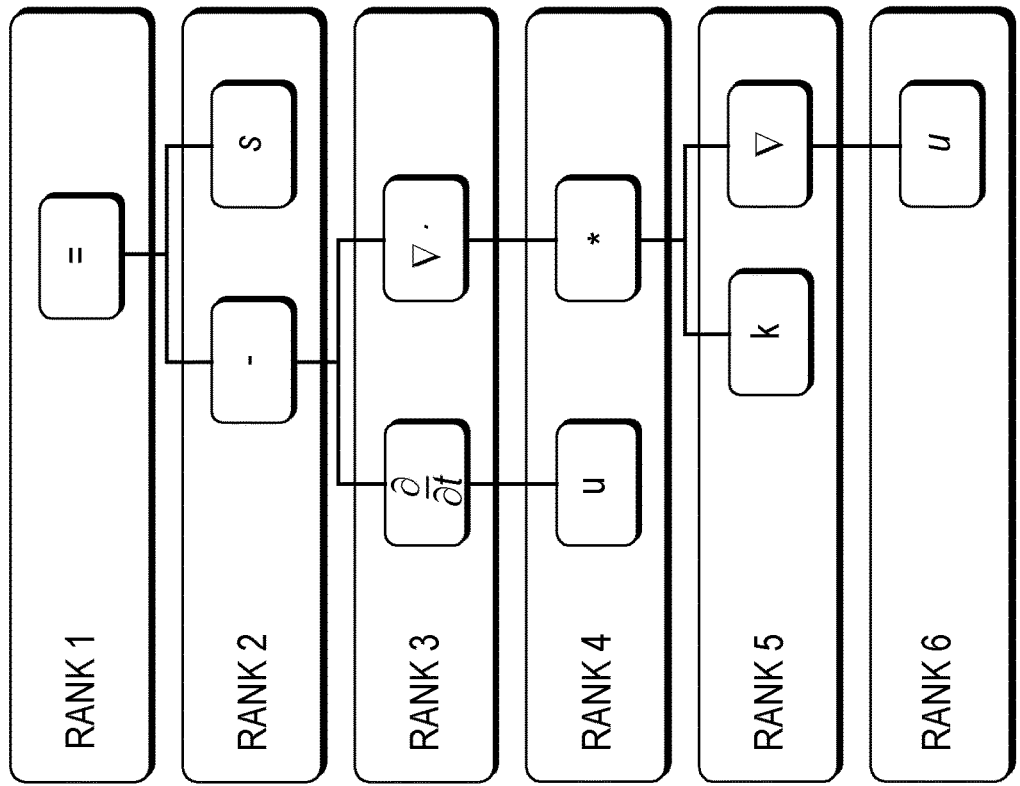

FIGS. 5A and 5B depicts further example expression trees to represent the differential equation symbolically in an example. FIG. 5A shows a symbolic representation 500, i.e., a grammar encoding of the set of constraints applied to symbols (i.e. the operators, variables and coefficients) of the basic diffusion advection equation. In embodiments herein, the symbolic differential equation 500 shown in FIG. 5A will have a companion partials structure 501 as shown in FIG. 5B that will keep track of the partial derivatives. In one embodiment, the method includes generating a companion structure for derivatives which companion structure is the analog to the expression tree containing the formula, and functions to hold the first-order derivatives of the quantities in the expression tree. The companion structure is used to encode the correct rules for the computation of derivatives.

For example: suppose there is the formula x*y. This can be encoded with the "cherry-shaped" expression tree with three nodes: two leaf nodes, one containing 'x', one containing 'y', and '*' that multiplies its two children 'x' and 'y'. To encode the derivatives of this expression, there is generated a mirror of the tree. Thus, there is created a corresponding second tree that contains 'dx/dt' in the node corresponding to 'x', 'dy/dt' in the node corresponding to 'y', and 'd*/dt' in the node that corresponding to '*'. Using the chain rule, the expression 'd*/dt' evaluates to 'y dx/dt+x dy/dt', and it is noticed that all terms of this expression are readily available either in the original expression tree, or as children nodes in the expression tree for first order information. A companion structure for second-order information could easily be built, and in this case it would contain 'd(dx/dt)/dt' in the node corresponding to 'dx/dt', which is none other than the second derivative of 'x', and so on.

Returning back to FIG. 2, the input and output training set data stored at memory device 260 are input to a processing module and models are run to search for relevant points in a mathematical space that corresponds to points representing differential operator expressions. In one embodiment, there is provided a search space 270 of encoded grammars (expression trees), that can be used to best represent the phenomena being measured. To discover a differential equation governing a measured phenomenon, a search is conducted among grammars, each grammar representing differential equations and having associated significant points that most adequately relates observed (output) phenomena to its corresponding set of inputs and input conditions. The search space may thus include the significant points of all of the encoded grammars or subsets thereof.

As shown in FIG. 2, one program module stored in a device memory 254 may include the differential equation discovery and model finder module 265 which invokes Mixed Integer Non-Linear programming techniques to recognize and identify types of differential equations given a set of inputs and corresponding measured observation/output data. For example, training data sets from memory storage 260 that are input to the system under investigation may initially include a combination of input data and output data used to build a mathematical model to identify most meaningful quantities, i.e., points in a space, that represent valid expressions with differential operators, and then an algorithm, e.g., a MINLP solver (model finder module), for identifying the meaningful expressions. Thus, from searching a given search space 270, a model may identify, from the points in a search space, those meaningful expressions associated with corresponding differential operations that explain the received data.

In one embodiment, a simplest expression (least complex) type of differential operations is found that explains the input data. The models used to recognize expression types can be stored as grammars having the grammatical rules that define the syntax of valid expressions, e.g., admissible relationships between quantities. That is, the grammar rules are used to build the mapping between meaningful expressions and points in a multi-dimensional Euclidean space. This space is searched with the model finder module (e.g., MINLP solver). Then a search is conducted for determining which valid expressions satisfy the grammar. The user may additionally choose, via device interface, the expression that fits the data. The grammars are used to map a given set of inputs to a set of measured outputs. In one embodiment, given new inputs and output training data sets, these expressions identifying models may be continuously updated.

Once these models have been developed, a search engine module 268 may be called to invoke services of a local or remote based search engine to determine from the mathematical search space 270 of points based, the corresponding expressions that are candidates for explaining the phenomena represented by the received input and output data. In one embodiment, once a model may be invoked to identify a particular expression type, i.e., differential equation form, a search may be conducted of sets of particular expression(s) types that may include that form. In one embodiment, the search engine module 268 may find multiple expression(s) types of varying ranges of complexity. In one embodiment, the search space 270 of points corresponding to forms of differential equations may be searched to determine the candidate links, i.e., differential equation(s) that govern a given set of input data to measured outputs within a predetermined numerical error bound.

In one embodiment, by using a formalized language, an optimization problem is articulated that seeks in a space of valid (parseable) sentences, a sentence(s) whose numerical evaluation for the input points, yields similar value as the ones provided by the measurements. The search is for a sentence of minimal descriptive length, i.e., the search performs looking for the simplest equation whose numerical evaluation upon the data provided is close to the true measurements. The search is articulated as a mixed integer non-linear program, where the integer decision parameters aim at figuring the functional form of the sentence, while the non-linear decision parameters are meant for the numerical evaluation of the sentence at the data points.

In one embodiment, there is incorporated a different "descriptive cost" that is assessed for the use of any operator or variable, in case it is desired to favor for instance equations that do not involve the rotor operation. That is, further to constructing of the mapping between formulas and points in space, a function is found that evaluates the "cost", or "value", of these points. For example, a linear function may be used to determine costs: e.g., an instance of a "d/dt" differential operator costs "3" and each instance of "+" operator costs "1" in the formula, resulting that dx/dt+dy/dt has a total cost of 7.

In one embodiment, the optimization problem is articulated on a high level as defined entities including but not limited to:

$$\min_{s} C(s) \ldots \text{complexity value}$$

$$\text{s.t. } \mathcal{D}(s(x), d) \leq \tau \ldots \text{fidelity}$$

$$\text{parse}(s) \in \mathcal{T} \ldots \text{structural (grammar)}$$

-continued $$s \in \Sigma^* \ldots \text{symbols (primitives) choice}$$

$$s \in I \ldots \text{invariances}$$

where
$X \in \chi$—set of training datum
$d \in \mathcal{Y}$—set of targets associated with x
$\Sigma$—set of admissible symbols
$\Sigma^*$—all words in the language
$\mathcal{T}$—a proper tree structure
C—a measure of complexity
$\mathcal{D}$—noise model
I—invariances $s \in \Sigma^*$ and parse$(s) \in \mathcal{T}$ implies that $s \in \mathcal{L}(\mathcal{T}, \Sigma)$ (s belongs to the formal language).

As further shown in FIG. 2, in one embodiment, a MINLP solver module 275 is provided for implementing mixed-integer non-linear programming techniques for determining an expression. In one embodiment, the non-linear expressions are expressible in a tree form with different connectivities amongst the variable, constants, operator and differential operator entities. The search space information is a mixed-integer, non-linear program for non-linear expressions. MINLP packages or solvers 275 (e.g., Baron, Couenne, etc.) run methods set forth in FIGS. 3 and 4 for determining the optimization problem using the entities articulated above.

Finally, a complexity value determination module 280 may be provided that implements logic for determining a complexity value of a differential equation form. For instance, based on a particular expression length, or based on the number or types of differential operators present in the expression, a complexity (or alternatively, a simplicity) value is assigned. Thus, from a ranking of expressions based on complexity, a most simplistic expression for mapping of the input to outputs may be found. Once candidate expressions are found from the search space, module 275 employs logic for determining, e.g., based on their complexity values, the simplest expression form of a differential equation (i.e., a sentence of minimal descriptive length) from the set of candidates that can satisfy the link between the inputs and outputs.

The generation of the simplest differential equation form is beneficial when modeling reactions as less computing resources (memory, processing power) is expended in solving differential equation forms when performing modeling and simulation on a computing system. The proper discovery of mathematical models involving differential equations is essential for a broad range of cognitive as well as IoT (Internet-of-Things) applications. Further benefits of generating a simplest differential equation form include: 1) Interpretational power: a simpler expression is typically easier to process by a human being, increasing the chances of deriving insight about the phenomenon described by the equation; 2) Occam's razor: in nature, the simpler explanation is often preferred, as long as the equation faithfully explains the observations; and 3) Simplification of further handling: if the equation discovered must be embedded in a numerical simulation, or has to be further manipulated from an analytical point of view, a simpler expression facilitates the task.

In one embodiment, an evaluation of the non-linear differential expressions may require simulation. There are various ways to numerically simulate a differential equation, (e.g. finite difference, finite volume, boundary elements, finite elements, discontinuous Galerkin, spectral elements, etc.)

For instance, a finite difference discretization scheme would imply explicit articulation of the differential operators using standard differential operators templates.

Time differentiation can be performed explicitly, implicitly, or hybrids of which (e.g. forward Euler, backward Euler, Newmark predictor corrector, Runge-Kutta, etc.)

Figure 3:
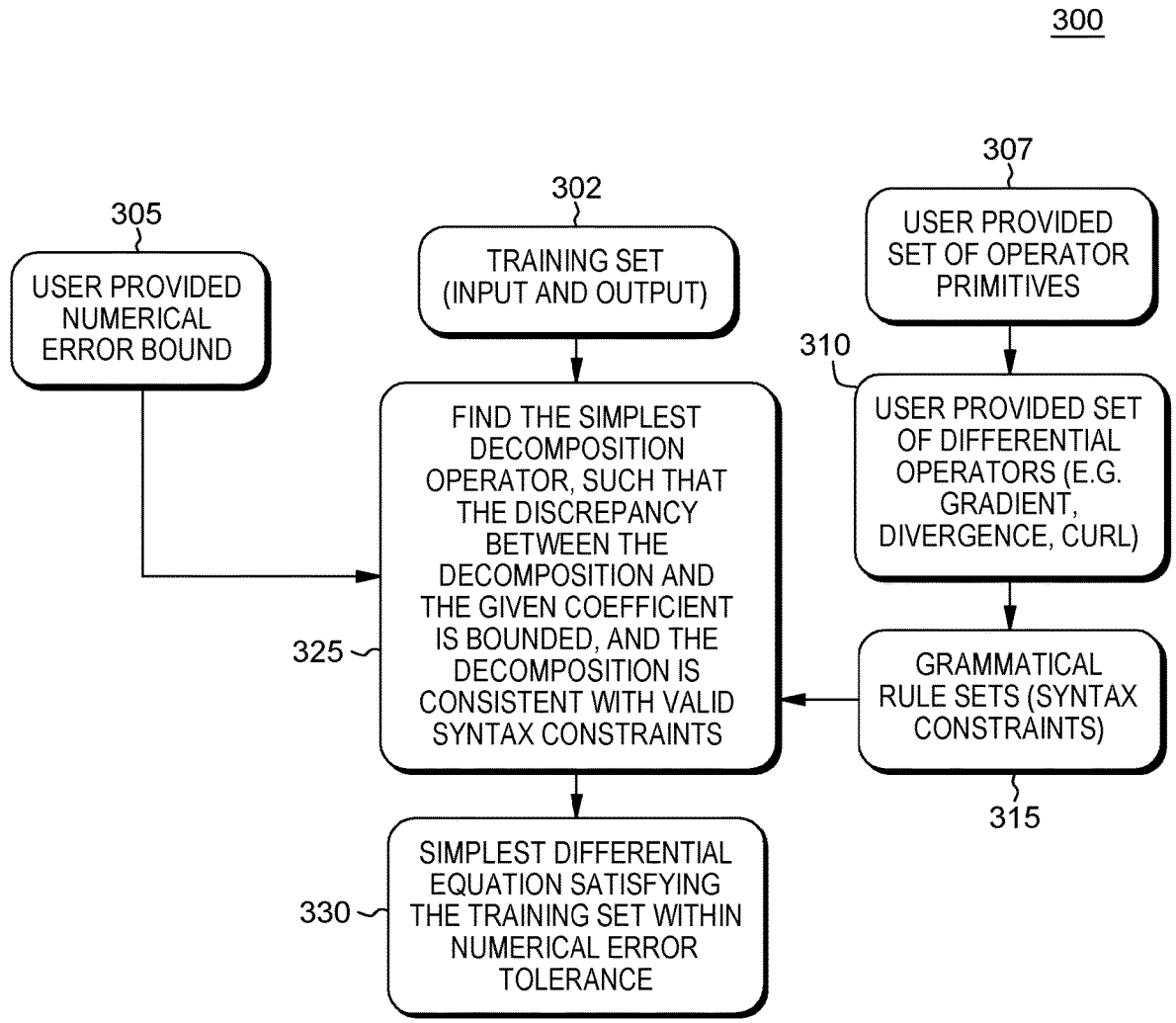
FIG. 3 shows a method run by the computing system of FIG. 2 for automated differential equation discovery.

FIG. 3 shows a method 300 run by the computing system of FIG. 2 for automated differential equation discovery by employing the processing modules in memory 254. As shown at 302, the system receives the training set (input and output data) such as data relating to an observed or measured physical phenomena such as obtained from one or more sensor devices. The system further receives: expression(s) types represented as grammars relating to particular differential equation forms having differential operators; a user provided numerical error bound 305 representing an acceptable degree or fidelity the user is willing to tolerate. The methods 300 are specified to achieve a balance of complexity and accuracy to obtain the best differential equation linking the input data to the measured outputs. Further provided to the system may include a user provided set of operator primitives 307 (e.g., +, ×, /), a user provided set of differential operators (e.g. gradient, divergence, derivative, curl) 310, and the grammatical rule sets governing allowable combinations of differential operators and other entities (e.g., syntax constraints, etc.) 315 and a superset of operator types and differential operator types.

Based on the received data received at 305, 307, 310, 315, the system runs method 325 of FIG. 3 to determine a simplest differential equation satisfying the received data set within the numerical error tolerance. In one embodiment, the method attempts to minimize the complexity of the expression, e.g., such that the complexity does not exceed a particular value. In one embodiment, the user determines based on inputs, the types of constraints on fidelity of the model, and how accurate the model should be in terms of how it explains the data. In one embodiment, the complexity of the resulting model may be modified.

As a result of searching points of multiple differential equation forms in a defined mathematical space, there may be found a best expression form representing the differential operators governing the input and measured outputs data. Then, at 325, the logic finds the point in space corresponding (mapped to) the best (simplest) equation that explains the data within a given discrepancy value. The equation is decomposed as an expression tree, with companion structures that express the derivatives of the terms in the expression tree. There is still the global constraint that we are only interested in formula such that, when applied to the given input data, they produce an output that is close enough to the observed data. For example, let $(x^i, y^i)$ be the training data, where $x^i$ are the observed input variables, and $y^i$ is the observed output (here "i" is an index for the training examples, not an exponent). The method postulates an existence of a function g( ) such that $g(x^i)=y^i$. It is desired to find a function $f( )$ such that $f(x^i) \approx y^i$. Then, $f( )$ is decomposed into an expression tree, with companion structures to capture the derivatives. Then a measure of discrepancy could be: $\|f(x^i)-y^i\|$, which is the same as $$\sqrt{\sum_i (f(x^i)-y^i)^2}.$$

Alternatively, different measures may be taken.

In one embodiment, the mapping is defined ahead of time and the MINLP program searches the solutions according to the mapping that the user may have defined. The mapping entered by a user may define what points in space the user is interested in as the points correspond to the mathematical expressions having differential operators. Thus, a descriptive procedure is provided in advance that defines exactly what characterizes mathematically correct expressions with differential operators, such that a search space characterized this way may be subsequently searched. The search software searches the space, e.g., the space of candidate expressions used to look for the simplest expression of minimal complexity to describe the input data.

The method performs at 325, FIG. 3, an evaluation of the expression given the data that has been provided (inputs and outputs) and in one embodiment; a simplest expression having differential operators is obtained.

Figure 4:
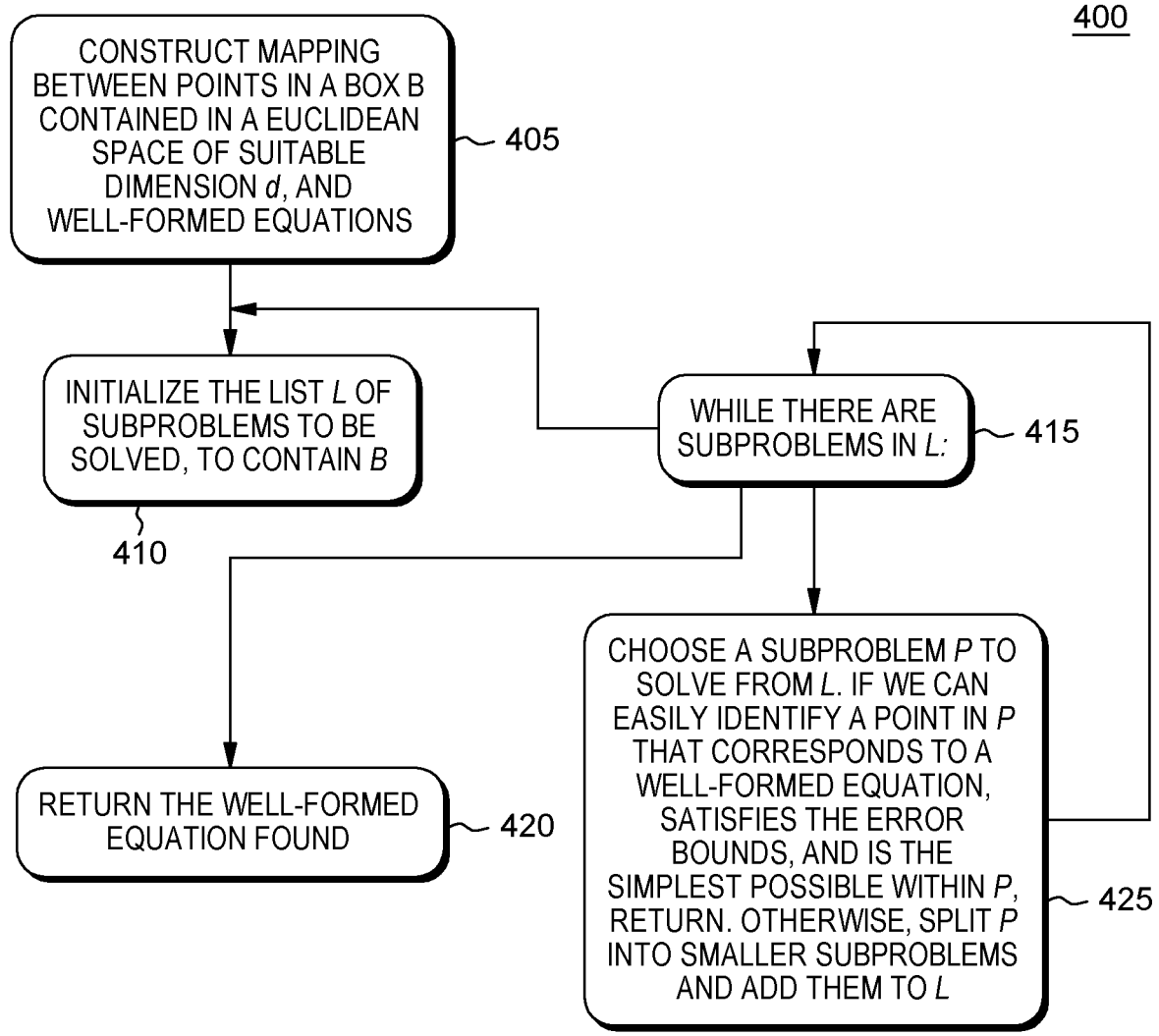
FIG. 4 shows a method run by the computing system of FIG. 2 for automated differential equation discovery corresponding to the method step 325 of FIG. 3.

FIG. 4 shows a method 400 run by the computing system of FIG. 2 for automated differential equation discovery corresponding to the method step 325 of FIG. 3. In performing the method 400 various processing modules in memory 254 are implemented. As shown at 405, the method includes generating the mathematical search space by constructing a mapping between "points" in a "box" contained in a Euclidean space of suitable dimension d. The points represent well-formed equations. The "box" is the space, or a part of the space (to which the well-formed expressions having differential operators are mapped). The box may or may not contain well-formed expressions. If the box does not contain well-formed expression, the search algorithm conducted by the MINLP solver will eliminate it during the search. This mapping of points to well-formed equations may be created in advance, i.e., before the search begins, to associate pre-defined points in a search space with well-formed equations having differential operators. The mapping depends on the input provided by the user that includes: the training data; the set of operators that is desired to be used; the bounds on the size of the expression tree that is to be obtained; and bounds on the total discrepancy between the observed outputs and the outputs generated by the trained model.

In one embodiment, the constructed mappings of points in a space (box) to a well-formed differential equations may be stored in a database as a list of sub-problems 270, with each sub-problem representing a box, for example. Each mapping of well-formed expressions to points in space depends on which operators, variables, and constants that are allowed in the expression. There is a 1:1 correspondence between certain points in the space and well-defined mathematical expressions, while other points may not mean anything. The mapping may include a mapping of points to and from a high-dimensional space. For example, a small mathematical expression may be represented as points in a space of a dimension d≥3.

Then at 410, the method performs initializing a list L of sub-problems that are still to be explored to be solved that are contained in the box.

In one embodiment, as depicted at steps 415 and 425, the grammar search engine searches the list of sub-problems or boxes initialized at 410 that are to be explored. In one embodiment, a search algorithm run at the computer system iteratively explores the list of boxes, and at one box at a time, performs MI-NLP techniques to try to find a well-formed expression inside it by mapping to the points characteristic of that expression. If there is no well-formed expression is found, the method invokes routines to split the box into smaller boxes, to facilitate easier searching inside each smaller one.

Thus, for every sub-problem in the list of sub-problems, the techniques employed perform a mapping between points and mathematical expressions through a system of (in general, nonlinear) inequalities/equalities called "constraints", e.g., a simple one being something of the form $x*y/z=w$, e.g., where x, y, z are variables. If a point satisfies all those constraints, it is a well formed expression. If it does not, then it is not a well-formed expression. In one embodiment, it is this system of constraints that is represented as a system of equations. All solutions to this system are well-formed expressions, and they are explored as such. It is understood that if the system of the equalities/inequalities has n variables, they live in a n-dimensional Euclidean space. The system of equations/inequalities, i.e. the constraints, is a Mixed-Integer Nonlinear Program. The technique used to find a solution to this system is a MINLP algorithm known in the art.

It is the case that such a system is nonlinear. In one embodiment, to determine its solution, methods may be invoked to partition the space (i.e., a box) in which the variables of this system live, into smaller "boxes", i.e. smaller parts of the space. Then the MI-NLP program implemented looks inside these smaller boxes, with the expectation that once the search space is restricted to a smaller part of the space, the search for the well-formed expression will be easier. A criterion to conclude the search is the eventuality that as the method keeps sub-dividing boxes into smaller boxes, the search has to conclude because a box will contain so little "space" that it will be easy to check whether it contains a solution to the aforementioned system.

Thus, at 415, the method chooses a given sub-problem P to solve from the list L. The MI-NLP methods determine whether a point in P can be easily identified that corresponds to a well-formed equation, satisfies the numerical error bounds, and is the simplest possible within P, and if so, then the well-formed expression is output at 420. Otherwise, the sub-problem P is split into smaller sub-problems and these sub-problems are added to the list L for selection at 415.

In the discovery of a differential equation at 425, using the input training set data, numerical error bound data, primitive operators and differential operators, a MI-NLP program is described which finds an expression tree of least description complexity that fits a set of observations as well as required constraints.

Figure 6:
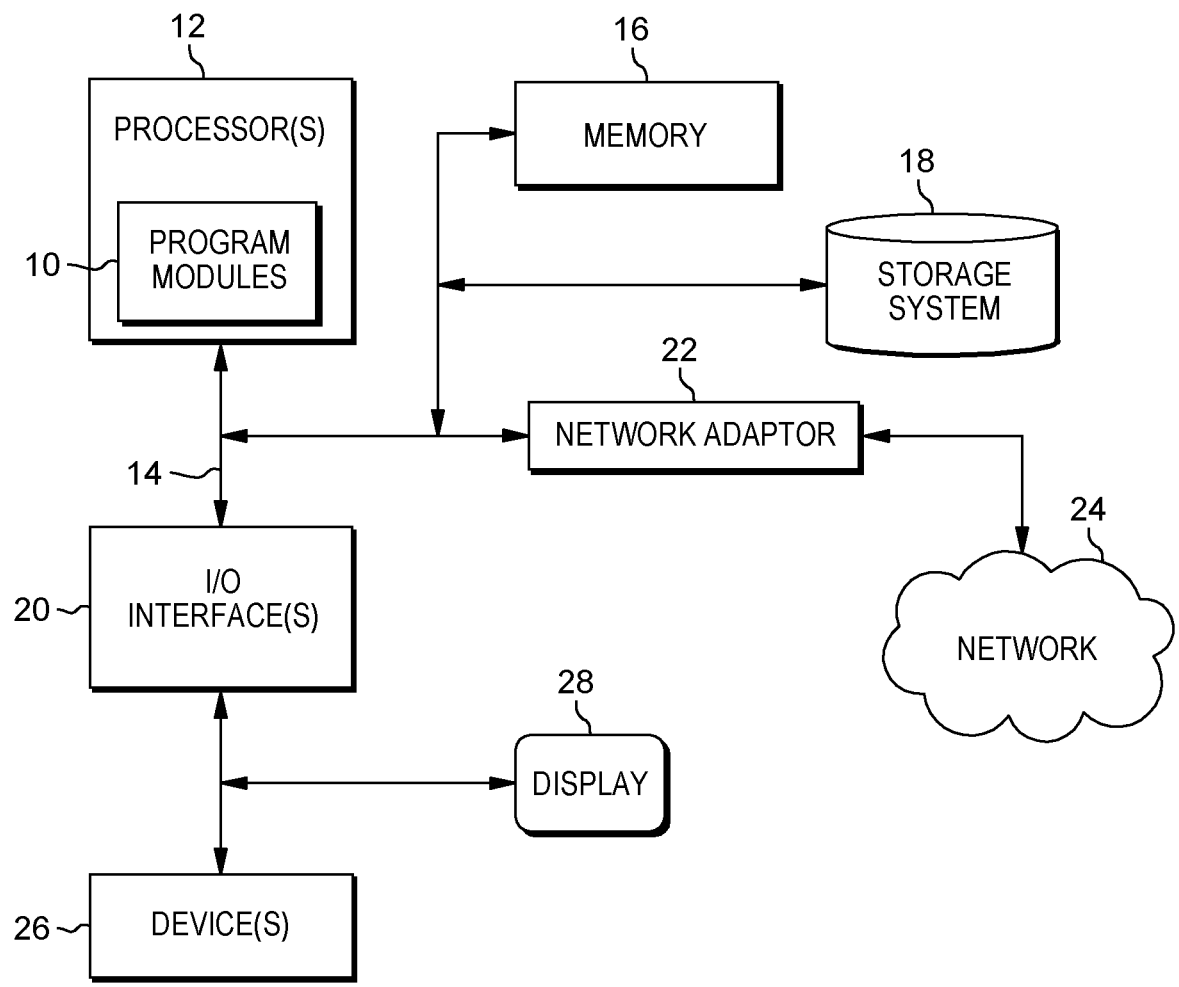
FIG. 6 illustrates an example computing system in accordance with an embodiment.

FIG. 6 illustrates an example computing system in accordance with the present invention that may provide the services and functions associated with the discovery of models involving differential operations that describe a phenomenon under investigation. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 3, 4 and 5A-5B.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of modeling a dynamic physical system or a process comprising:
receiving at a hardware processor, a training data set providing training data representing a phenomenon or a physical system to be modeled, said training data including input training data representing input conditions of the physical system or phenomenon and output training data relating to measurement outputs observed at the physical system or phenomenon;
accessing, using the hardware processor, a plurality of grammars stored in a memory storage device, a respective grammar encoding a set of rules and syntax constraints defining admissible relationships between entities comprising differential operators, primitive operators, variables, and coefficients representing a respective differential equation expression, each respective grammar used to construct a mapping of the corresponding differential equation expression to pre-defined data points in a defined multi-dimensional model space, each respective differential equation expression corresponding to a respective valid differential equation in the defined multi-dimensional model space;
iteratively processing, at the hardware processor, said plurality of grammars to identify a simplest differential equation expression corresponding to a valid differential equation that relates the input training data and measurement outputs observed such that a numerical discrepancy between an evaluation of the simplest differential equation expression for the input training data and the measurement outputs observed is bounded within a numerical error bound tolerance, said iterative processing of the plurality of grammars comprising:
searching, using said hardware processor, said defined multi-dimensional model space to determine candidate grammars corresponding to differential equation expressions having mapped pre-defined data points in the defined multi-dimensional model space that link the input training data and output data points relating to the measurement outputs observed, said searching comprising:
generating, using the hardware processor, a mixed integer non-linear program (MINLP) defining an objective function representing the defined multi-dimensional model space as an expression tree comprising operators, said operators including said differential operators, and operands, together with a corresponding companion expression tree structure to encode derivatives of the differential equation expression; and
solving, using the hardware processor, the MINLP by optimizing the objective function subject to one or more constraints to determine a model in the defined multi-dimensional model space that fits the observed measurement data while minimizing a complexity of the differential equation expression, said solving comprising:
for a chosen candidate grammar:
obtaining, using said hardware processor, a numerical evaluation for input data points of said input training data and the output data points of said output training data;
determining, using said hardware processor, a numerical discrepancy between an evaluation of the simplest differential equation expression for the input training data and the measurements outputs observed, said MINLP having integer decision parameters creating a functional form of a grammar, and numerically evaluating non-linear decision parameters of the grammar at the data points; and
comparing, using said hardware processor, the numerical evaluation for input data points and output data points for the candidate grammar against a similar numerical evaluation based on input data points of said input training data and values of the measurement outputs observed; and
based on said comparing, identifying, using said hardware processor, the simplest differential equation expression corresponding to a chosen candidate grammar whose numerical evaluation of the input training data provide output data points closest to said values of the measurements outputs observed;
outputting the simplest differential equation expression satisfying the training data within said numerical error bound tolerance, and
using, by said hardware processor, said output simplest differential equation expression for modeling a behavior of the dynamic physical system to be modeled.

2. The method as claimed in claim 1, further comprising:
receiving, at said hardware processor, a set of symbols of a formal language representing the differential operators, primitive operators, variables, and coefficients; and
generating, by the hardware processor, a plurality of formal language sentences from said primitive operators, differential operators, variables, and coefficients and defined syntax constraints of said grammars, one formal language sentence of said plurality representing the identified simplest differential equation expression relating said input training data to said measurement outputs observed of said output training data.

3. The method as claimed in claim 2, further comprising:
receiving, at said hardware processor, a numerical error bound tolerance value representing the numerical error bound tolerance for use in evaluating the simplest differential equation expression;
finding, using said hardware processor, a simplest expression tree structure that encodes the differential equation expression and the corresponding companion expression tree structure, such that a discrepancy between an evaluation of the simplest expression tree structure on the input training data and the output training data does not exceed said numerical error bound tolerance value, and the simplest expression tree structure and companion expression tree structure encoding said derivatives are consistent with said syntax constraints.

4. The method as claimed in claim 3, further comprising:
storing each generated formal language sentence in a memory storage device associated with said hardware processor.

5. The method as claimed in claim 1, wherein said iteratively processing, at the hardware processor, said plurality of grammars to identify said simplest differential equation expression further comprises:
for a chosen sentence,
identifying whether a data point maps to a data point of a differential equation expression of a valid differential equation, and satisfies the numerical error bound tolerance value, and, if not,
partitioning, using said hardware processor, said defined multi-dimensional model space into a smaller model search space; and
conducting a search in the smaller model search space to identify a sentence of minimal descriptive length describing a simplest differential equation expression whose numerical evaluation upon the input training data provided is closest to the observed measurements of said output training data.

6. The method as claimed in claim 1, further comprising:
constructing, by the hardware processor, a mapping of symbols of a formal language sentence representing a well-formed mathematical expression or grammar having one or more differential operators to significant data points in a corresponding defined multi-dimensional model space, said corresponding defined multi-dimensional model space of a dimension d that relates input and corresponding output data of a training data set.

7. A system for modeling a dynamic physical system or a process comprising:
at least one memory storage device; and
one or more hardware processors operatively connected to said at least one memory storage device, said one or more hardware processors configured to:
receive a training data set providing training data representing a phenomenon of a physical system to be modeled, said training data including input training data representing input conditions of the physical system or phenomenon and output training data relating to measurement outputs observed at the physical system or phenomenon;
access a plurality of grammars stored in a memory storage device, a respective grammar encoding a set of rules and syntax constraints defining admissible relationships between entities comprising differential operators, primitive operators, variables, and coefficients representing a respective differential equation expression, each respective grammar used to construct a mapping of the corresponding differential equation expression to pre-defined data points in a defined multi-dimensional model space, each respective differential equation expression corresponding to a respective valid differential equation in the defined multi-dimensional model space;
iteratively process said plurality of grammars to identify a simplest differential equation expression corresponding to the respective valid differential equation that relates the input training data and measurement outputs observed such that a numerical discrepancy between an evaluation of the simplest differential equation for the input training data and the measurement outputs observed is bounded within a numerical error bound tolerance, wherein to iteratively process said plurality of grammars, said one or more hardware processors are further configured to:
search said defined multi-dimensional model space to determine candidate grammars corresponding to differential equation expressions having mapped pre-defined data points in the defined multi-dimensional model space that link the input training data and output data points relating to the measurement outputs observed, wherein to search, said one or more hardware processors are further configured to:
generate a mixed integer non-linear program (MINLP) defining an objective function representing the defined multi-dimensional model space as an expression tree comprising operators, said operators including said differential operators, and operands, together with a corresponding companion expression tree structure to encode derivatives of the differential equation expression; and
solve the MINLP by optimizing the objective function subject to one or more constraints to determine a model in the defined multi-dimensional model space that fits the observed measurement data while minimizing a complexity of the differential equation expression, said solving comprising:
for a chosen candidate grammar:
obtain a numerical evaluation for input data points of said input training data and the output data points of said output training data;
determine a numerical discrepancy between an evaluation of the simplest differential equation expression for the input training data and the measurements outputs observed, said MINLP having integer decision parameters creating a functional form of a grammar, and numerically evaluating non-linear decision parameters of the grammar at the data points; and
compare the numerical evaluation for input data points and output data points for the candidate grammar against a similar numerical evaluation based on input data points of said input training data and values of the measurement outputs observed; and
based on said comparing, identify the simplest differential equation expression corresponding to a chosen candidate grammar whose numerical evaluation of the input training data provide output data points closest to said values of the measurements outputs observed;
output the simplest differential equation expression satisfying the training data within said numerical error bound tolerance, and use said output simplest differential equation expression for modeling a behavior of the dynamic physical system to be modeled.

8. The system as claimed in claim 7, wherein said one or more hardware processors are configured to:
receive a set of symbols of a formal language representing the differential operators, primitive operators, variables, and coefficients; and
generate a plurality of formal language sentences from said primitive operators, differential operators, variables, and coefficients and defined syntax constraints of said grammars, one formal language sentence of said plurality representing the identified simplest differential equation expression relating said input training data to said measurement outputs observed of said output training data.

9. The system as claimed in claim 8, wherein said one or more hardware processors are configured to:
receive a numerical error bound tolerance value representing the numerical error bound tolerance for use in evaluating the simplest differential equation expression;
find a simplest expression tree that encodes the differential equation expression and the corresponding companion expression tree structure, such that a discrepancy between an evaluation of the simplest expression tree structure on the input training data and the output training data does not exceed said numerical error bound tolerance value, and the simplest expression tree structure and corresponding companion expression tree structure encoding said derivatives are consistent with said syntax constraints.

10. The system as claimed in claim 9, wherein said one or more hardware processors are configured to:
store each generated formal language sentence in said memory storage device.

11. The system as claimed in claim 7, wherein to iteratively process said one or more formal language sentences of said plurality to identify said simplest differential equation expression, said one or more hardware processors are further configured to:
for a chosen sentence,
identify whether a data point maps to a data point of a differential equation expression of a valid differential equation, and satisfies the numerical error bound tolerance value, and, if not,
partition said defined multi-dimensional model space into a smaller model search space; and
conduct a search in the smaller model search space to identify a sentence of minimal descriptive length describing a simplest differential equation expression whose numerical evaluation upon the input training data provided is closest to the observed measurements of said output training data.

12. The system as claimed in claim 7, wherein said one or more hardware processors are configured to:
construct a mapping of symbols of a formal language sentence representing a well-formed mathematical expression or grammar having one or more differential operators to significant data points in a corresponding defined multi-dimensional model space, said corresponding defined multi-dimensional model space of a dimension d that relates input and corresponding output data of a training data set.

13. A computer program product for modeling a dynamic physical system or a process, the computer program product comprising a non-transitory storage medium readable by a processing circuit and storing instructions run by the processing circuit for performing a method comprising:
receiving, at the processing circuit, a training data set providing training data representing a phenomenon or a physical system to be modeled, said training data including input training data representing input conditions of the physical system or phenomenon and output training data relating to measurement outputs observed at the physical system or phenomenon;
accessing, using the processing circuit, a plurality of grammars stored in a memory storage device, a respective grammar encoding a set of rules and syntax constraints defining admissible relationships between entities comprising differential operators, primitive operators, variables, and coefficients representing a respective differential equation expression, each respective grammar used to construct a mapping of the corresponding differential equation expression to predefined data points in a defined multi-dimensional model space, each respective differential equation expression corresponding to a respective valid differential equation in the defined multi-dimensional model space;
iteratively processing, at the processing circuit, said plurality of grammars to identify a simplest differential equation expression corresponding to a valid differential equation that relates the input training data and measurement outputs observed such that a numerical discrepancy between an evaluation of the simplest differential equation expression for the input training data and the measurement outputs observed is bounded within a numerical error bound tolerance, said iterative processing of the plurality of grammars comprising:
searching said defined multi-dimensional model space to determine candidate grammars corresponding to differential equation expressions having mapped predefined data points in the defined multi-dimensional model space that link the input training data and output data points relating to the measurement outputs observed, wherein to search, said program instructions further configuring the computer to:
generate a mixed integer non-linear program (MINLP) defining an objective function representing the defined multi-dimensional model space as an expression tree comprising operators, said operators including said differential operators, and operands, together with a corresponding companion expression tree structure to encode derivatives of the differential equation expression; and
solve the MINLP by optimizing the objective function subject to one or more constraints to determine a model in the defined multi-dimensional model space that fits the observed measurement data while minimizing a complexity of the differential equation expression, said solving comprising:
for a chosen candidate grammar:
obtaining a numerical evaluation for input data points of said input training data and the output data points of said output training data;
determining a numerical discrepancy between an evaluation of the simplest differential equation expression for the input training data and the measurements outputs observed, said MINLP having integer decision parameters creating a functional form of the grammar, and numerically evaluating non-linear decision parameters of the grammar at the data points; and comparing the numerical evaluation for input data points and output data points for the candidate grammar against a similar numerical evaluation based on input data points of said input training data and values of the measurement outputs observed; and based on said comparing, identifying the simplest differential equation expression corresponding to a chosen candidate grammar whose numerical evaluation of the input training data provide output data points closest to said values of the measurements outputs observed;

outputting the simplest differential equation expression satisfying the data within said numerical error bound tolerance, and using, by said hardware processor, said output simplest differential equation expression for modeling a behavior of the dynamic physical system to be modeled.

14. The computer program product as claimed in claim 13, wherein the method further comprises:

receiving, at the processing circuit, a set of symbols of a formal language representing the differential operators, primitive operators, variables, and coefficients; and generating a plurality of formal language sentences from said primitive operators, differential operators, variables, and coefficients and defined syntax constraints of said grammars, one formal language sentence of said plurality representing the identified simplest differential equation expression relating said input training data to said measurement outputs observed of said output training data.

* * * * *